(12) United States Patent
Friend et al.

(10) Patent No.: US 8,818,650 B2
(45) Date of Patent: Aug. 26, 2014

(54) OPERATIONAL PARAMETER DETERMINATION SYSTEMS AND METHODS WITH GEAR SHIFTING COMPENSATION

(75) Inventors: Paul Russell Friend, Morton, IL (US);
Drew Alan Fehr, Washington, IL (US);
Frank Arthur Willis, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 13/601,218

(22) Filed: Aug. 31, 2012

(65) Prior Publication Data

US 2014/0067213 A1    Mar. 6, 2014

(51) Int. Cl.
*G06F 17/00* (2006.01)
*A01B 69/00* (2006.01)
*E02F 9/20* (2006.01)

(52) U.S. Cl.
CPC .............. *A01B 69/003* (2013.01); *E02F 9/202* (2013.01)
USPC .......................................................... 701/50

(58) Field of Classification Search
CPC ..... A01B 69/003; A01B 69/008; E02F 9/202; F16H 61/0213; F16H 2061/0081
USPC ......................................... 701/50, 51, 53, 57
See application file for complete search history.

(56) References Cited

U.S. PATENT DOCUMENTS

| | | | |
|---|---|---|---|
| 5,925,087 A | 7/1999 | Ohnishi et al. | |
| 6,622,091 B2 | 9/2003 | Perlmutter et al. | |
| 7,472,010 B2 * | 12/2008 | Thomson et al. | 701/51 |
| 2004/0117092 A1 * | 6/2004 | Budde | 701/50 |
| 2009/0309793 A1 | 12/2009 | Loomis | |
| 2014/0052351 A1 * | 2/2014 | Weber | 701/51 |

* cited by examiner

*Primary Examiner* — Mary Cheung
(74) *Attorney, Agent, or Firm* — Finnegan, Henderson, Farabow, Garrett & Dunner LLP (57) ABSTRACT

An operational parameter determination system is disclosed. The operational parameter determination system may include an operational parameter predictor configured to calculate an a priori estimated operational parameter of the machine based on a previously estimated operational parameter. The operational parameter determination system may also include a gear shifting compensator configured to determine whether a gear shifting is in progress, and when the gear shifting is in progress, to output the a priori estimated operational parameter as a determined operational parameter. The operational parameter determination system may further include an operational parameter updater configured to, when the gear shifting is not in progress, receive a measured operational parameter of the machine, determine an a posteriori estimated operational parameter of the machine based on the a priori estimated operational parameter and the measured operational parameter, and output the a posteriori estimated operational parameter as the determined operational parameter.

20 Claims, 7 Drawing Sheets

OPERATIONAL PARAMETER DETERMINATION SYSTEMS AND METHODS WITH GEAR SHIFTING COMPENSATION

TECHNICAL FIELD

The present disclosure relates generally to systems and methods for determining machine operational parameters, more specifically, to systems and methods for determining machine operational parameters with gear shifting compensation.

BACKGROUND

Autonomously controlled and/or semi-autonomously controlled machines are capable of operating with little or no human input by relying on information received from various machine systems. Based on signals indicative of machine movement, terrain, and/or machine operations, a machine can be controlled to complete a programmed task remotely and/or automatically. By receiving appropriate feedback from each of the different machine systems during performance of the task, continuous adjustments to machine operational parameters can be made that help to ensure precision and safety in completion of the task. In order to do so, however, the information provided by the different machine systems should be accurate and reliable.

However, during operation of these machines, large dynamics may occur on the machine during gear shifting may cause one or more of the signals indicative of machine movement, terrain, and machine operations to become vastly incorrect, causing errors in the adjustments.

An exemplary system that may be used to eliminate errors of operational parameter estimation due to gear shifting is disclosed in U.S. Pat. No. 5,925,087 to Ohnishi et al. that was issued on Jul. 20, 1999 ("the '087 patent"). Specifically, the system estimates an estimated slope value by a slope estimation unit just prior to gear shifting, and holds the estimated slope value constant throughout a noise eliminating period, so as to suppress any change of the estimated slope value during the noise elimination time period. In this way, the '087 patent purports to eliminate slope estimation errors due to gear-shifting.

Although the system of the '087 patent may be useful in eliminating the slope estimation errors due to gear-shifting, the slope estimation unit of the '087 patent unnecessarily performs the process of slope estimation during the noise elimination time period. This may unnecessarily consume the power and computing resources of the machine system.

The operational parameter determination system of the present disclosure is directed toward solving the problem set forth above and/or other problems of the prior art.

SUMMARY

In one aspect, the present disclosure is directed to an operational parameter determination system. The operational parameter determination system may include an operational parameter predictor configured to calculate an a priori estimated operational parameter of the machine based on a previously estimated operational parameter. The operational parameter determination system may also include a gear shifting compensator configured to determine whether a gear shifting is in progress, and when the gear shifting is in progress, to output the a priori estimated operational parameter as a determined operational parameter. The operational parameter determination system may further include an operational parameter updater configured to, when the gear shifting is not in progress, receive a measured operational parameter of the machine, determine an a posteriori estimated operational parameter of the machine based on the a priori estimated operational parameter and the measured operational parameter, and output the a posteriori estimated operational parameter as the determined operational parameter.

In another aspect, the present disclosure is directed to a computer-implemented method of determining an operational parameter of a machine. The method may include calculating an a priori estimated operational parameter of the machine based on a previously estimated operational parameter. The method may also include determining whether a gear shifting is in progress. The method may further include, when the gear shifting is in progress, outputting the a priori estimated operational parameter as a determined operational parameter, and when the gear shifting is not in progress, measuring a measured operational parameter of the machine, calculating an a posteriori estimated operational parameter of the machine based on the a priori estimated operational parameter and the measured operational parameter, and outputting the a posteriori estimated operational parameter as the determined operational parameter.

In yet another aspect, the present disclosure is directed to a computer-readable storage device storing instructions for determining an operational parameter of a machine. The instructions may cause one or more computer processors to calculate an a priori estimated operational parameter of the machine based on a previously estimated operational parameter. The instructions may also cause one or more computer processors to determine whether a gear shifting is in progress. The instructions may further cause one or more computer processors to, when the gear shifting is in progress, output the a priori estimated operational parameter as a determined operational parameter, and when the gear shifting is not in progress, measure a measured operational parameter of the machine, calculate an a posteriori estimated operational parameter of the machine based on the a priori estimated operational parameter and the measured operational parameter, and output the a posteriori estimated operational parameter as the determined operational parameter.

DETAILED DESCRIPTION

Figure 1:
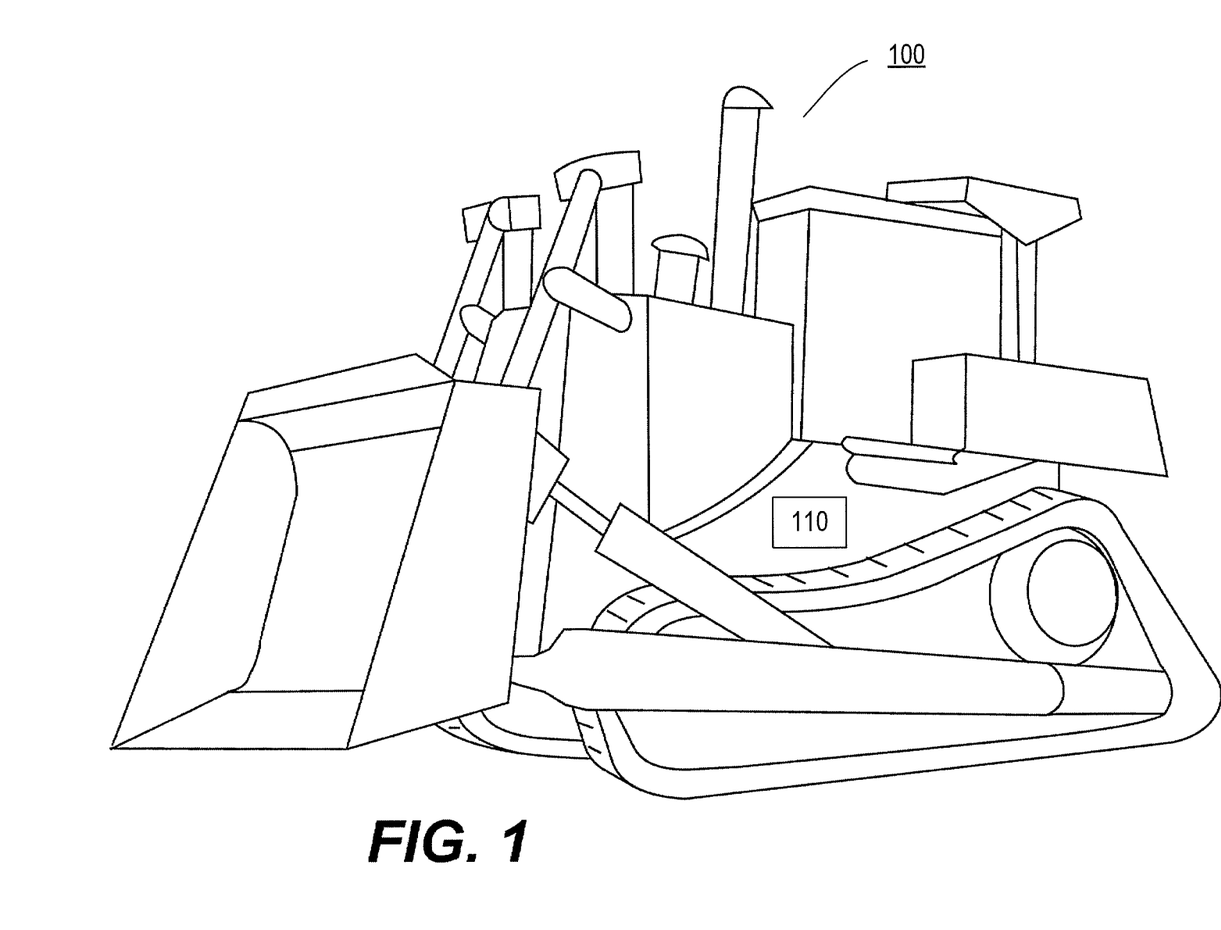
FIG. 1 is a pictorial illustration of an exemplary machine.

FIG. 1 illustrates a machine 100 having an exemplary operational parameter determination system 110. Machine 100 may embody a machine configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine.

Operational parameter determination system 110 may include components that cooperate to gather information from machine 100 that may be used to determine operational parameters of machine 100 during its operation. The term "operational parameter" refers to a determined quantity that is indicative of how machine 100 operates. For example, operational parameter determination system 110 may include various sensors, e.g., accelerometers, gyroscopes, global positioning system (GPS) devices, radar devices, etc., that may be used to measure, e.g., location, horizontal, vertical, and forward velocities and accelerations, inclination angle (e.g., pitch), inclination angular rate, heading, yaw rate, roll angle, roll rate, etc. Operational parameter determination system 110 may also include a gear sensor for detecting gear information such as a current gear location of machine 100, a time during which machine 100 is shifting gears, etc. Operational parameter determination system 110 may further include sensors for receiving signals indicative of operator interface commands, such as gear, joy stick position. Operational parameter determination system 110 may include any combination of hardware and/or software capable of executing one or more computer programs that may include algorithms, such as a Kalman filter algorithm, to process the measurements made by the various sensors.

Figure 2:
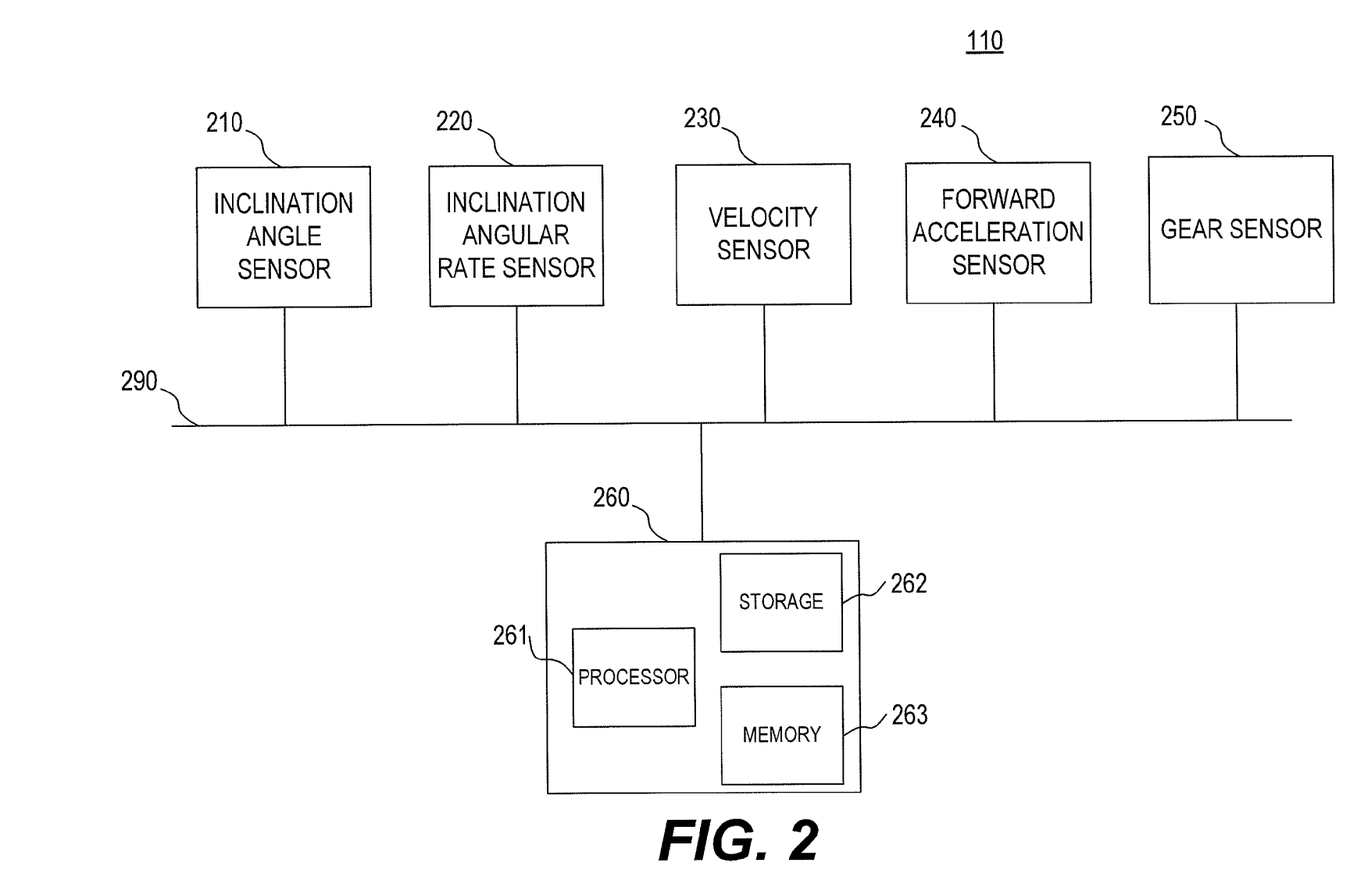
FIG. 2 is a diagrammatic illustration of an exemplary operational parameter determination system that may be used in conjunction with the machine of FIG. 1.

FIG. 2 illustrates an exemplary operational parameter determination system 110 that may be used in conjunction with machine 100. Operational parameter determination system 110 may include an inclination angle sensor 210, an inclination angular rate sensor 220, a velocity sensor 230, a forward acceleration sensor 240, a gear sensor 250, and a controller 260 connected to each other via bus 290. While a bus architecture is shown in FIG. 2, any suitable architecture may be used, including any combination of wired and/or wireless networks. Additionally, such networks may be integrated into any local area network, wide area network, and/or the Internet.

Inclination angle sensor 210 may include any device capable of measuring the inclination angle, e.g., pitch, of a machine. For example, inclination angle sensor 210 may include one or more accelerometers and/or pendulous-based inclinometers capable of measuring the inclination angle of a machine along one or more axes. Similarly, inclination angular rate sensor 220 may include any device capable of measuring the inclination angular rate of change, e.g., pitch rate, of a machine. For example, inclination angular rate sensor 220 may include one or more accelerometers and/or gyroscopes. In certain embodiments, inclination angle sensor 210 and inclination angular rate sensor 220 may be incorporated in a single sensor.

Velocity sensor 230 may include any device capable of measuring a machine's velocity. For example, velocity sensor 230 may include one or more global positioning system (GPS) receivers, one or more radar-based devices, one or more sensors positioned on a wheel or axle of machine 100, one or more sensors or other devices for measuring transmission speed, etc. Forward acceleration sensor 240 likewise may include any device capable of measuring a machine's forward acceleration. For example, acceleration sensor 240 may include one or more accelerometers and/or may include hardware and/or software capable of calculating acceleration values from a time series output of velocity sensor 230.

Gear sensor 250 may include a device capable of detecting gear information. For example, gear sensor 250 may receive a gear shifting signal via bus 290 indicating that a gear shifting is to be performed, or that the gear shifting is in progress. The gear shifting signal may further indicate a direction of the machine's movement.

Controller 260 may include processor 261, storage 262, and memory 263, included together in a single device and/or provided separately. Processor 261 may include one or more known processing devices, such as a microprocessor from the Pentium™ or Xeon™ family manufactured by Intel™, the Turion™ family manufactured by AMD™, or any other type of processor. Memory 263 may include one or more storage devices configured to store information used by controller 260 to perform certain functions related to the disclosed embodiments. Storage 262 may include a volatile or non-volatile, magnetic, semiconductor, tape, optical, removable, nonremovable, or other type of storage device or computer-readable medium. Storage 262 may store programs and/or other information, such as information related to processing data received from one or more sensors, as discussed in greater detail below.

In one embodiment, memory 263 may include one or more inclination angle determination programs or subprograms loaded from storage 262 or elsewhere that, when executed by processor 261, perform various procedures, operations, or processes consistent with disclosed embodiments. For example, memory 263 may include one or more programs that enable controller 260 to, among other things, collect data from sensors 210-250, process the data according to the disclosed embodiments such as those embodiments discussed with regard to FIGS. 3-7, and determine an operational parameter of a machine based on the processed data.

In certain embodiments, memory 263 may include a program enabling controller 260 to process the data using a Kalman filter. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance), and a current measurement value to produce a refined a posteriori estimate. In the present specification and the claims, the term "a priori value estimate" refers to a value that is calculated in the predict phase of a Kalman filter, and the term "a posteriori value estimate" refers to a value that is calculated in the update phase of a Kalman filter.

In certain embodiments of the present disclosure, the update phase of the Kalman filter may be performed only when a gear shifting of machine 100 is not in progress. In the disclosed embodiments, the period when the gear shifting is in progress extends from the beginning of a gear shift until the effects of the gear shift on machine 100 have ceased. For example, as discussed above, the gear shift may impart various forces on machine 100 that cause accelerations, vibrations, or other dynamic movement of machine 100 in one or more directions. The gear shifting may be considered to be in progress during the period of time that extends until these accelerations, vibration, or other dynamic movement have ended. In certain embodiments, the time period when the gear shifting is in progress may be defined by a user or an operator to be a predetermined time period, based on, one or more criteria, such as for example, the model type of the machine, the weight of the machine, the number of gears that the machine has, the maximum velocity of the machine, etc.

Figure 3:
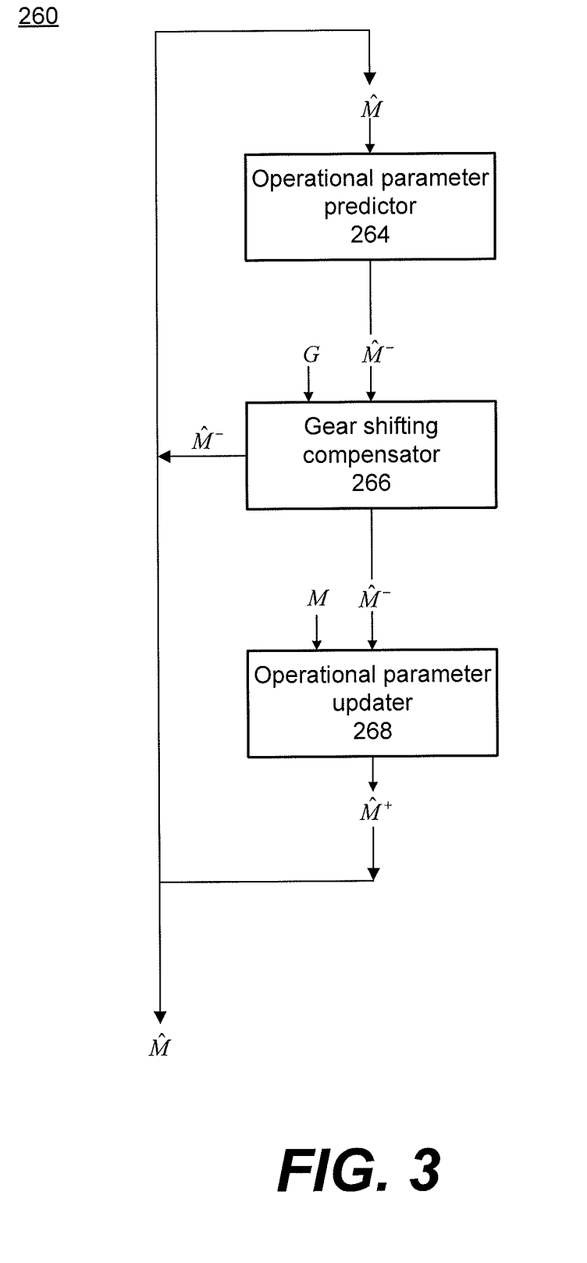
FIG. 3 is a diagrammatic illustration of an exemplary controller that may be used in conjunction with the operational parameter determination system of FIG. 2.

FIG. 3 illustrates an exemplary embodiment of controller 260, which may include an operational parameter predictor 264, a gear shifting compensator 266, and an operational parameter updater 268. Operational parameter predictor 264 may be configured to calculate an a priori estimated operational parameter $\hat{M}^-$ of the machine based on a previously estimated operational parameter $\hat{M}$. Gear shifting compensator 266 may be configured to determine whether a gear shifting is in progress. If the gear shifting is in progress, the a priori estimated operational parameter $\hat{M}^-$ may be output as a determined operational parameter. If the gear shifting is not in progress, operational parameter updater 268 may be configured to receive a measured operational parameter M of the machine, determine an a posteriori estimated operational parameter $\hat{M}^+$ of the machine based on the a priori estimated operational parameter $\hat{M}^-$ and the measured operational parameter M, and output the a posteriori estimated operational parameter $\hat{M}^+$ as the determined operational parameter.

Although the components included in controller 260 are shown as separate components, they may be implemented in any combination of hardware and/or software. For example, in one embodiment, the components in controller 260 shown in FIG. 3 may be implemented in the form of software stored on one or more of storage 262 and/or memory 263 that, when executed by processor 261, enable controller 260 to perform functions related to the disclosed embodiments.

Figure 4:
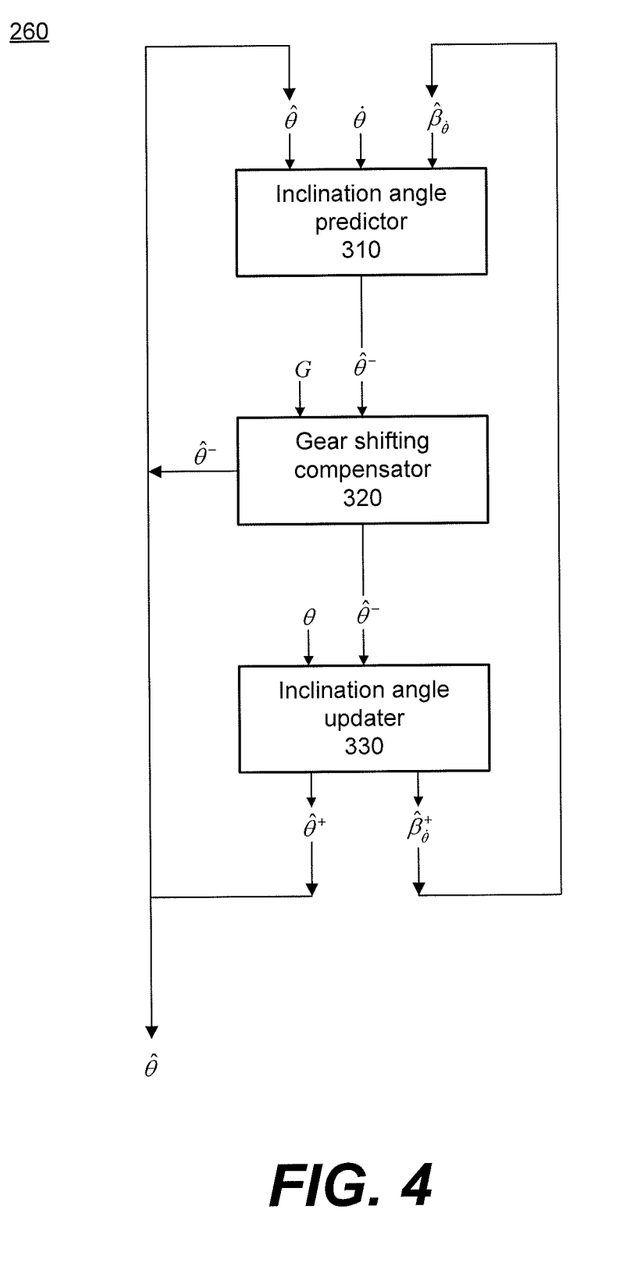
FIG. 4 is a diagrammatic illustration of another exemplary controller that may be used in conjunction with the operational parameter determination system of FIG. 2.

According to an exemplary embodiment, controller 260 may be configured to determine an inclination angle of the machine. FIG. 4 illustrates another exemplary configuration of controller 260 according to this exemplary embodiment. Controller 260 may include an inclination angle predictor 310, a gear shifting compensator 320, and an inclination angle updater 330. Again, while these components are shown as separate components, they may be implemented in any combination of hardware and/or software, such as software stored on one or more of storage 262 and/or memory 263 that, when executed by processor 261, enable controller 260 to perform functions related to the disclosed embodiments.

Inclination angle predictor 310 may be configured to calculate an a priori estimated inclination angle of the machine based on a previously estimated inclination angle. For example, inclination angle predictor 310 may receive a previously estimated inclination angle $\hat{\theta}$ and a previously estimated inclination angular rate bias $\hat{\beta}_{\dot{\theta}}$. Inclination angle predictor 310 may also receive a measured inclination angular rate $\dot{\theta}$ from inclination angular rate sensor 220. Inclination angle predictor 310 may use this data to calculate an a priori estimated inclination angle $\hat{\theta}^-$ of the machine. For example, inclination angle predictor 310 may use linear extrapolation to calculate the a priori estimated inclination angle according to known methods.

Gear shifting compensator 320 may be configured to determine whether or not to update the inclination angle $\hat{\theta}$ of the machine based on gear shifting information. For example, gear shifting compensator 320 may determine that a gear shifting is in progress based on a gear shifting signal G, and may output the a priori estimated inclination angle $\hat{\theta}^-$ as the estimated inclination angle $\hat{\theta}$ of the machine, which is also fed back to inclination angle predictor 310. Otherwise, when gear shifting compensator 320 determines that no gear shifting is in progress, gear shifting compensator 320 may be configured to transfer the a priori estimated inclination angle $\hat{\theta}^-$ to inclination angle updater 330, which subsequently updates the estimated inclination angle $\hat{\theta}$ of the machine. In certain embodiments, the gear shifting signal G may be generated by an operator of the machine. Alternatively, in a machine with an automatic transmission, the gear shifting signal G may be transmitted before an automatic gear shifting occurs. In certain embodiments, gear shifting compensator 320 may include a timer indicating how long the gear shifting may take.

Inclination angle updater 330 may be configured to calculate an a posteriori estimated inclination angle $\hat{\theta}^+$ of the machine based on the a priori estimated inclination angle $\hat{\theta}^-$ received from inclination angle predictor 310, and a measured inclination angle $\theta$ received from inclination angle sensor 210. Inclination angle updater 330 may be configured to output the a posteriori estimated inclination angle $\hat{\theta}^+$ as the estimated inclination angle $\hat{\theta}$ of the machine, which is also fed back to inclination angle predictor 310. Inclination angle updater 330 may also be configured to calculate and output an estimated inclination angular rate bias $\hat{\beta}_{\dot{\theta}}^+$ based on the a priori estimated inclination angle $\hat{\theta}^-$ and the measured inclination angle $\theta$. The estimated inclination angular rate bias $\hat{\beta}_{\dot{\theta}}^+$ is also fed back to inclination angle predictor 310. In one embodiment, inclination angle updater 330 may be configured to determine the a posteriori estimated inclination angle $\hat{\theta}^+$ and the inclination angular rate bias $\hat{\beta}_{\dot{\theta}}^+$ in accordance with known methods.

Figure 5:
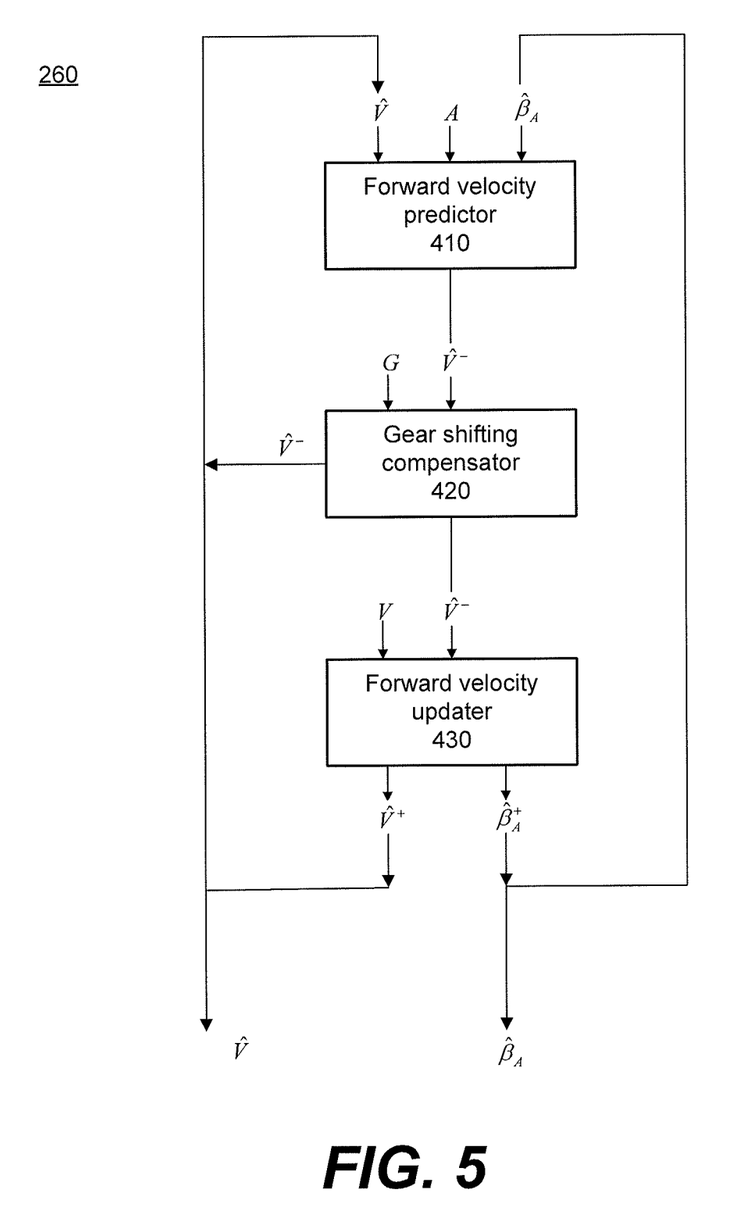
FIG. 5 is a diagrammatic illustration of yet another exemplary controller that may be used in conjunction with the operational parameter determination system of FIG. 2.

According to an exemplary embodiment, controller 260 may be configured to determine a forward velocity of the machine. FIG. 5 illustrates another exemplary configuration of controller 260 according to this exemplary embodiment. Controller 260 may include a forward velocity predictor 410, a gear shifting compensator 420, and a forward velocity updater 430. Although the embodiments of FIGS. 4 and 5 illustrate different configurations of controller 260, those skilled in the art will appreciate that these embodiments can be combined such that controller 260 includes, in one configuration, the inclination angle predictor 310, the inclination angle updater 330, the forward velocity predictor 410, the forward velocity updater 430, and a gear shifting compensator 320 interacting with all of these components to perform functions related to the disclosed embodiments.

Referring to FIG. 5, forward velocity predictor 410 may be configured to calculate an a priori estimated forward velocity of the machine based on a previously estimated forward velocity. In one embodiment, forward velocity predictor 410 may receive a previously estimated forward velocity $\hat{V}$ and a previously estimated acceleration bias $\hat{\beta}_A$. Forward velocity predictor 410 may also receive a measured acceleration value A from acceleration sensor 240. Forward velocity predictor 410 may use this data to calculate an a priori estimated forward velocity $\hat{V}^-$ of the machine. For example, forward velocity predictor 410 may use linear extrapolation to calculate the a priori estimated forward velocity.

Gear shifting compensator 420 may be configured to determine whether or not to update the forward velocity $\hat{V}$ of the machine by using forward velocity updater 430 based on a gear shifting signal G. Gear shifting compensator 420 may determine that a directional gear shifting is in progress based on a gear shifting signal G, and may output the a priori estimated forward velocity $\hat{V}^-$ as the estimated forward velocity $\hat{V}$ of the machine, which is also fed back to forward velocity predictor 410. Otherwise, when gear shifting compensator 420 determines that no directional gear shifting is in progress, gear shifting compensator 420 may be configured to transfer the a priori estimated forward velocity $\hat{V}^-$ calculated by forward velocity predictor 410 to forward velocity updater 430, which subsequently updates the estimated forward velocity $\hat{V}$ of the machine. Gear shifting compensator 420 may also be configured to determine a direction of the machine.

Forward velocity updater 430 may be configured to calculate an a posteriori estimated forward velocity $\hat{V}^+$ of the machine based on the a priori estimated forward velocity $\hat{V}^-$ received from forward velocity predictor 410, a measured velocity $\hat{V}$ received from velocity sensor 230, and the direction of the machine. Before calculating the a posteriori estimated forward velocity $\hat{V}^+$, forward velocity updater 430 may be configured to apply a sign to the measured velocity $\hat{V}$ indicating the direction of the measured velocity $\hat{V}$, e.g., based on the gear shifting signal G. For example, forward velocity updater 430 may multiply the measured velocity $\hat{V}$ by a sign of the gear shifting which is provided by the gear shifting signal G. Forward velocity updater 430 may be configured to output the a posteriori estimated forward velocity $\hat{V}^+$ as the estimated forward velocity $\hat{V}$ of the machine, which is also fed back to forward velocity predictor 410. Forward velocity updater 430 may be also configured to determine and output an estimated acceleration value $\hat{\beta}_A^+$ based on the a priori estimated forward velocity $\hat{V}^-$, the measured velocity $\hat{V}$, and the direction of the machine. The estimated acceleration value $\hat{\beta}_A^+$ may also be fed back to forward velocity predictor 410. In one embodiment, forward velocity updater 430 may be configured to determine the a posteriori estimated forward velocity and the estimated acceleration value $\hat{\beta}_A^+$ in accordance with known methods.

INDUSTRIAL APPLICABILITY

The disclosed operational parameter determination system may be applicable to any machine where accurate determination of the machine's operational parameter is desired. According to an exemplary embodiment, the disclosed operational parameter determination system may provide for improved determination of a machine's inclination angle through the use of a Kalman filter approach. The operation of operational parameter determination system 110 will now be described in connection with the flowchart of FIG. 6.

Figure 6:
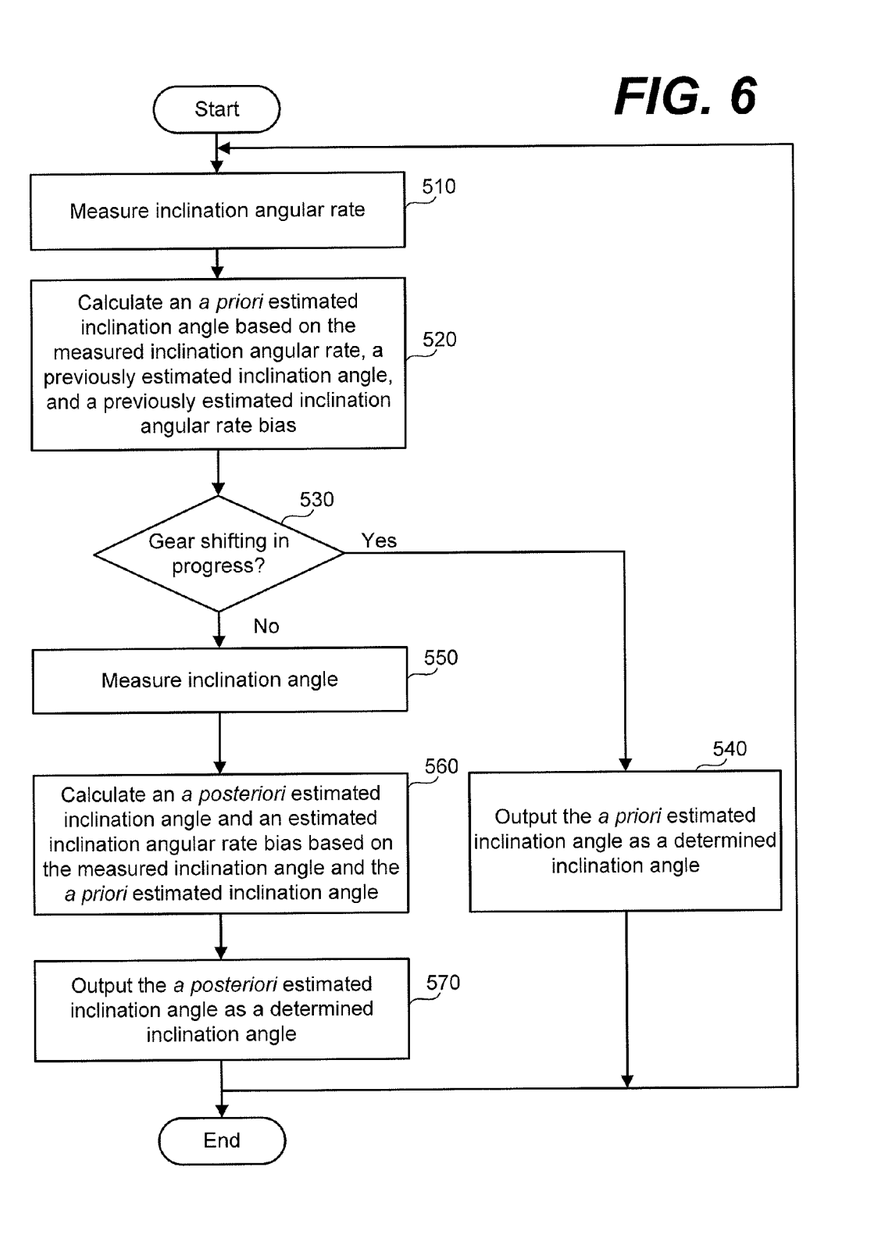
FIG. 6 is a flowchart depicting an exemplary method performed by the operational parameter determination system of FIG. 2 and/or the controller of FIG. 4.

Operational parameter determination system 110 may measure an inclination angular rate $\dot{\theta}$ (step 510). For example, controller 260 may receive a measure of the inclination angular rate $\dot{\theta}$ from inclination angular rate sensor 220. Operational parameter determination system 110 may calculate an a priori estimated inclination angle $\hat{\theta}^-$ based on the measured inclination angular rate $\dot{\theta}$, a previously estimated inclination angle $\hat{\theta}$, and a previously estimated inclination angular rate bias $\hat{\beta}_{\dot{\theta}}$ (step 520). For example, a predict phase of a Kalman filter may be implemented to calculate the a priori estimated inclination angle $\hat{\theta}^-$ based on a linear extrapolation from the previously estimated inclination angle $\hat{\theta}$, e.g., based on the following equation:

$$\hat{\theta}^- = \hat{\theta} + (\dot{\theta} - \hat{\beta}_{\dot{\theta}}) \Delta T \quad (1)$$

where $\hat{\theta}^-$ equals the a priori estimated inclination angle, $\hat{\theta}$ equals the previously estimated inclination angle calculated from a previous timestep, $\dot{\theta}$ equals the measured inclination angular rate value, $\hat{\beta}_{\dot{\theta}}$ equals the previously estimated inclination angular rate bias calculated from a previous timestep, and $\Delta T$ equals the time between timesteps in the Kalman filter. While a linear extrapolation method is used above in equation (1), any other method may be used to calculate the a priori estimated inclination angle, including, e.g., curve fitting analysis, regression analysis, estimates based on previously collected data, etc. In certain embodiments, an inclination angle preliminary variance may also be calculated.

Operational parameter determination system 110 may determine whether gear shifting is in progress based on a gear shifting signal (step 530). If the gear shifting is in progress (step 530, Yes), operational parameter determination system 110 may output the a priori estimated inclination angle $\hat{\theta}^-$ as a determined inclination angle of the machine (step 540). Then, the process may return to step 510 where the inclination angular rate $\dot{\theta}$ is measured for a subsequent timestep. The a priori estimated inclination angle $\hat{\theta}^-$ may be fed back as the previously estimated inclination angle $\hat{\theta}$ to calculate a new a priori estimated inclination angle $\hat{\theta}^-$ in step 520.

If no gear shifting is in progress (step 530, No), operational parameter determination system 110 may measure an inclination angle $\theta$ (step 550). Operational parameter determination system 110 may calculate an a posteriori estimated inclination angle $\hat{\theta}^+$ and an estimated inclination angular rate bias $\hat{\beta}_{\dot{\theta}}^+$ of the machine based on the a priori estimated inclination angle $\hat{\theta}^-$ calculated in step 520 and the inclination angle $\theta$ measured in step 550 (step 560). For example, an update phase of a Kalman filter may be implemented to calculate the a posteriori estimated inclination angle $\hat{\theta}^+$. Operational parameter determination system 110 may output the a posteriori estimated inclination angle $\hat{\theta}^+$ as a determined inclination angle of the machine (step 570). Afterwards, the process may return to step 510 where the inclination angular rate $\dot{\theta}$ is measured for a subsequent timestep. The a posteriori estimated inclination angle $\hat{\theta}^+$ calculated in step 560 may be fed back as the previously estimated inclination angle $\hat{\theta}$ to calculate a new a priori estimated inclination angle $\hat{\theta}^-$ in step 520. Likewise, the estimated inclination angular rate bias $\hat{\beta}_{\dot{\theta}}^+$ calculated in step 560 may be fed back as the previously estimated inclination angular rate bias $\hat{\beta}_{\dot{\theta}}$ to calculate a new a priori estimated forward velocity $\hat{V}^-$ in step 520. The process may continue to repeat in this manner until receiving instructions to stop or until new data ceases to be collected from the machine.

According to another exemplary embodiment, the disclosed operational parameter determination system may provide for improved determination of a machine's forward velocity through the use of a Kalman filter approach. The operation of operational parameter determination system 110 will now be described in connection with the flowchart of FIG. 7.

Figure 7:
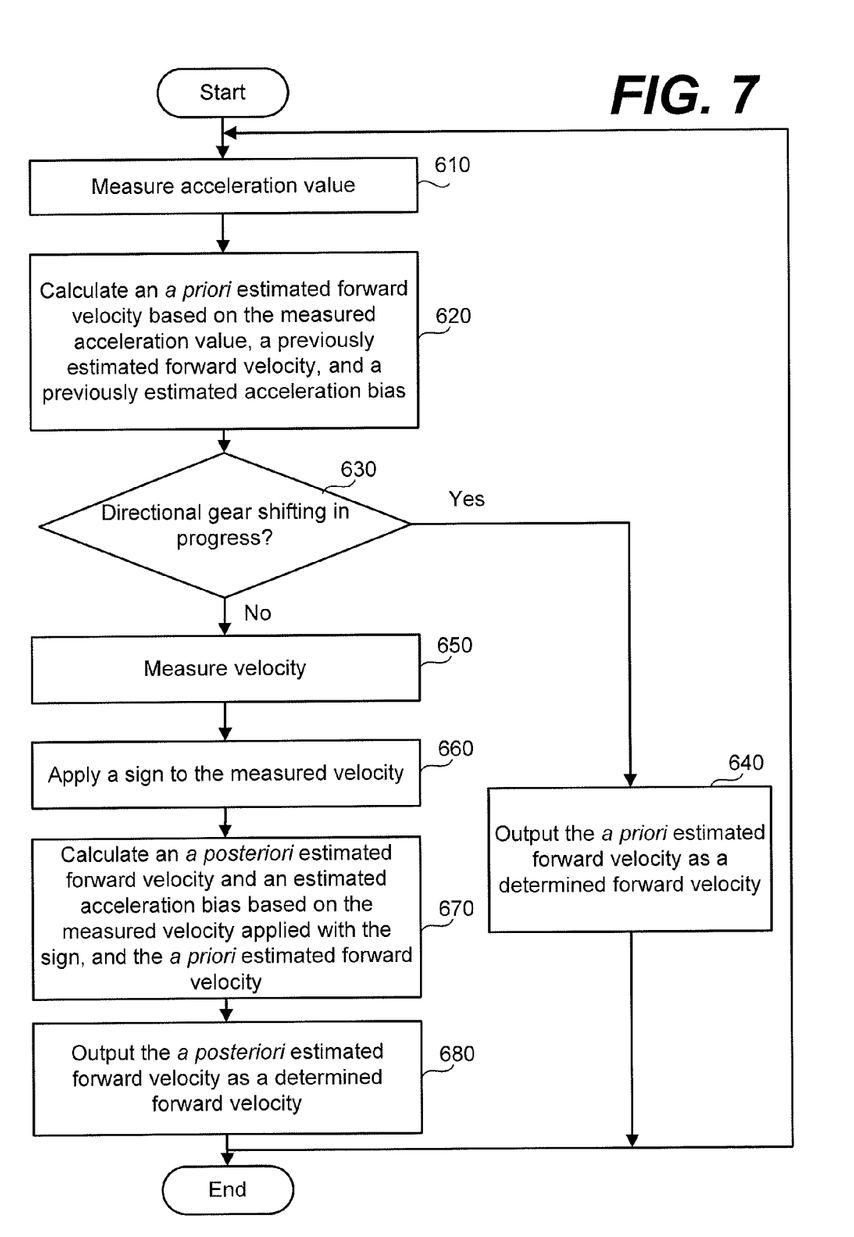
FIG. 7 is a flowchart depicting another exemplary method performed by the operational parameter determination system of FIG. 2 and/or the controller of FIG. 5.

Operational parameter determination system 110 may measure a measured acceleration value A by, for example, an accelerometer (step 610). Operational parameter determination system 110 may calculate an a priori estimated forward velocity $\hat{V}^-$ based on the measured acceleration value A, a previously estimated forward velocity $\hat{V}$, and a previously estimated acceleration bias $\hat{\beta}_A$ (step 620). For example, a predict phase of a Kalman filter may be implemented to calculate the a priori estimated forward velocity $\hat{V}^-$ based on a linear extrapolation from the previously estimated forward velocity $\hat{V}$, e.g., based on the following equation:

$$\hat{V}^- = \hat{V} + (A - \hat{\beta}_A) \Delta T \quad (2)$$

where $\hat{V}^-$ equals the a priori estimated forward velocity, $\hat{V}$ equals the previously estimated forward velocity from a previous timestep, A equals the measured acceleration value, $\hat{\beta}_A$ equals the previously estimated acceleration bias estimate from a previous timestep, and $\Delta T$ equals the time between timesteps in the Kalman filter. While a linear extrapolation method is used above in equation (2), any other method may be used to calculate the a priori estimated velocity, including, e.g., curve fitting analysis, regression analysis, estimates based on previously collected data, etc.

Operational parameter determination system 110 may determine whether a directional gear shifting is in progress, e.g., based on a gear shifting signal (step 630). If the directional gear shifting is in progress (step 630, Yes), operational parameter determination system 110 may output the a priori estimated forward velocity $\hat{V}^-$ as a determined forward velocity of the machine (step 640). Then, the process may return to step 610 where the acceleration value A is measured for a subsequent timestep. The a priori estimated forward velocity $\hat{V}^-$ may be fed back as the previously estimated forward velocity $\hat{V}$ to calculate a new a priori estimated forward velocity $\hat{V}^-$ in step 620.

If no directional gear shifting is in progress (step 630, No), operational parameter determination system 110 may measure a forward velocity V by, for example, a GPS receiver (step 650). Operational parameter determination system 110 may apply a sign to the measured forward velocity V based on the direction of the machine provided by the gear shifting signal (step 660). Operational parameter determination system 110 may calculate an a posteriori estimated forward velocity $\hat{V}^+$ and an estimated acceleration bias $\hat{\beta}_A^+$ of the machine based on the a priori estimated forward velocity $\hat{V}^-$ and the measured velocity V applied with the sign (step 670). Operational parameter determination system 110 may output the a posteriori estimated forward velocity $\hat{V}^+$ as the determined forward velocity of the machine (step 680). Afterwards, the process may return to step 610 where the acceleration value A is measured for a subsequent timestep. The a posteriori estimated forward velocity $\hat{V}^+$ calculated in step 670 may be fed back as the previously estimated forward velocity $\hat{V}$ to calculate a new a priori estimated forward velocity $\hat{V}^-$ in step 620. Likewise, the estimated acceleration bias $\hat{\beta}_A^+$ calculated in step 670 may be fed back as the previously estimated acceleration bias $\hat{\beta}_A$ to calculate a new a priori estimated forward velocity $\hat{V}^-$ in step 620. The process may continue to repeat in this manner until receiving instructions to stop or until new data ceases to be collected from the machine.

According to the above embodiments, the disclosed operational parameter determination system updates an estimated operational parameter based on a measured value of the operational parameter only when the gear shifting is not in progress. Therefore, the disclosed operational parameter determination system allows for a more accurate and reliable operational parameter estimation, while maintaining a simplified process.

It will be apparent to those skilled in the art that various modifications and variations can be made to the disclosed operational parameter determination system. Other embodiments will be apparent to those skilled in the art from consideration of the specification and practice of the disclosed operational parameter determination system. It is intended that the specification and examples be considered as exemplary only, with a true scope being indicated by the following claims and their equivalents.

What is claimed is:

1. A computer-implemented method of determining an operational parameter of a machine, the method comprising:
   calculating an a priori estimated operational parameter of the machine based on a previously estimated operational parameter;
   determining whether a gear shifting is in progress;
   when the gear shifting is in progress, outputting the a priori estimated operational parameter as a determined operational parameter; and
   when the gear shifting is not in progress:
      measuring a measured operational parameter of the machine;
      calculating an a posteriori estimated operational parameter of the machine based on the a priori estimated operational parameter and the measured operational parameter; and
      outputting the a posteriori estimated operational parameter as the determined operational parameter.

2. The computer-implemented method of claim 1, wherein the a priori estimated operational parameter and the a posteriori estimated operational parameter are calculated using a Kalman filter.

3. The computer-implemented method of claim 2, wherein the determined operational parameter is used as an input to the Kalman filter.

4. The computer-implemented method of claim 1, wherein the operational parameter is an inclination angle of the machine, and the method further includes:
   measuring a measured inclination angular rate;
   calculating an a priori estimated inclination angle based on the measured inclination angular rate, a previously estimated inclination angle, and a previously estimated inclination angular rate bias;
   determining whether a gear shifting is in progress;
   when the gear shifting is in progress, outputting the a priori estimated inclination angle as a determined inclination angle; and
   when the gear shifting is not in progress:
      measuring a measured inclination angle of the machine;
      calculating an a posteriori estimated inclination angle and a calculated inclination angular rate bias based on the a priori estimated inclination angle and the measured inclination angle; and
      outputting the a posteriori estimated inclination angle as the determined inclination angle.

5. The computer-implemented method of claim 4, further including:
   feeding back the determined inclination angle as the previously estimated inclination angle in the calculation of the a priori estimated inclination angle.

6. The computer-implemented method of claim 5, further including:
   feeding back the calculated inclination angular rate bias as the previously estimated inclination angular rate bias in the calculation of the a priori estimated inclination angle.

7. The computer-implemented method of claim 1, wherein the operational parameter is a forward velocity of the machine, and the method further includes:
   measuring a measured acceleration value;
   calculating an a priori estimated forward velocity based on the measured acceleration value, a previously estimated forward velocity, and a previously estimated acceleration bias;
   determining whether a directional gear shifting is in progress;
   when the directional gear shifting is in progress, outputting the a priori estimated forward velocity as a determined forward velocity; and
   when the directional gear shifting is not in progress:
      measuring a measured velocity of the machine;
      applying a sign to the measured velocity;
      calculating an a posteriori estimated forward velocity and a calculated acceleration bias based on the a priori estimated inclination angle and the measured velocity; and outputting the a posteriori estimated forward velocity as the determined forward velocity.

8. The computer-implemented method of claim 7, further including:
feeding back the determined forward velocity as the previously estimated forward velocity in the calculation of the a priori estimated forward velocity.

9. The computer-implemented method of claim 8, further including:
feeding back the calculated acceleration bias as the previously estimated acceleration bias in the calculation of the a priori estimated forward velocity.

10. An operational parameter determination system for determining an operational parameter of a machine, comprising:
an operational parameter predictor configured to calculate an a priori estimated operational parameter of the machine based on a previously estimated operational parameter;
a gear shifting compensator configured to determine whether a gear shifting is in progress, and when the gear shifting is in progress, to output the a priori estimated operational parameter as a determined operational parameter; and
an operational parameter updater configured to, when the gear shifting is not in progress:
receive a measured operational parameter of the machine;
determine an a posteriori estimated operational parameter of the machine based on the a priori estimated operational parameter and the measured operational parameter; and
output the a posteriori estimated operational parameter as the determined operational parameter.

11. The operational parameter determination system of claim 10, wherein the operational parameter predictor and the operational parameter updater are included in a Kalman filter.

12. The operational parameter determination system of claim 11, wherein the determined operational parameter is used as an input to the Kalman filter.

13. The operational parameter determination system of claim 10, further including:
an inclination angle predictor configured to calculate an a priori estimated inclination angle of the machine based on a previously estimated inclination angle;
the gear shifting compensator configured to determine whether a gear shifting is in progress, and when the gear shifting is in progress, to output the a priori estimated inclination angle as a determined inclination angle; and
an inclination angle updater configured to, when the gear shifting is not in progress:
receive a measured inclination angle of the machine;
determine an a posteriori estimated inclination angle of the machine based on the a priori estimated inclination angle and the measured inclination angle; and
output the a posteriori estimated inclination angle as the determined inclination angle.

14. The operational parameter determination system of claim 13, wherein the inclination angle predictor and the inclination angle updater are included in a Kalman filter.

15. The operational parameter determination system of claim 13, wherein the forward velocity predictor and the forward velocity updater are included in a Kalman filter.

16. The operational parameter determination system of claim 14, wherein the determined inclination angle is used as an input to the Kalman filter.

17. The operational parameter determination system of claim 14, wherein the determined forward velocity is used as an input to the Kalman filter.

18. The operational parameter determination system of claim 10, further including:
a forward velocity predictor configured to calculate an a priori estimated forward velocity of the machine based on a previously estimated forward velocity;
the gear shifting compensator configured to determine whether a directional gear shifting is in progress, and when the directional gear shifting is in progress, to output the a priori estimated forward velocity as a determined forward velocity; and
a forward velocity updater configured to, when the directional gear shifting is not in progress:
receive a measured forward velocity of the machine;
determine an a posteriori estimated forward velocity of the machine based on the a priori estimated forward velocity and the measured forward velocity; and
output the a posteriori estimated forward velocity as the determined inclination angle.

19. A computer-readable storage device storing instructions for determining an operational parameter of a machine, the instructions causing one or more computer processors to perform operations comprising:
calculating an a priori estimated operational parameter of the machine based on a previously estimated operational parameter;
determining whether a gear shifting is in progress;
when the gear shifting is in progress, outputting the a priori estimated operational parameter as a determined operational parameter; and
when the gear shifting is not in progress:
measuring a measured operational parameter of the machine;
calculating an a posteriori estimated operational parameter of the machine based on the a priori estimated operational parameter and the measured operational parameter; and
outputting the a posteriori estimated operational parameter as the determined operational parameter.

20. The computer-readable storage device of claim 19, wherein the a priori estimated operational parameter and the a posteriori estimated operational parameter are calculated using a Kalman filter.

* * * * *